US010949392B2

(12) United States Patent
Boutnaru (10) Patent No.: US 10,949,392 B2
(45) Date of Patent: *Mar. 16, 2021

(54) STEGANOGRAPHY OBSFUCATION (71) Applicant: PAYPAL, INC., San Jose, CA (US)

(72) Inventor: Shlomi Boutnaru, Modiin (IL)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/459,374

(22) Filed: Jul. 1, 2019

(65) Prior Publication Data
US 2020/0034335 A1 Jan. 30, 2020

Related U.S. Application Data (63) Continuation of application No. 15/609,087, filed on May 31, 2017, now Pat. No. 10,339,103.

(51) Int. Cl.
G06F 16/14 (2019.01)
G06F 21/62 (2013.01)
H04L 29/06 (2006.01)

(52) U.S. Cl.
CPC ........ G06F 16/148 (2019.01); G06F 21/6209 (2013.01); H04L 63/0245 (2013.01); H04L 63/0428 (2013.01); H04L 63/123 (2013.01); H04L 63/1416 (2013.01)

(58) Field of Classification Search
CPC ..... H04N 2201/327; H04N 2201/3281; H04N 1/32149; H04N 1/2351; H04N 1/3216; H04N 19/467; G11B 20/00891; G06T 1/0021; G06T 2201/0051; G06T 2201/0052; G10L 19/018; H04L 2209/608
See application file for complete search history.

(56) References Cited

U.S. PATENT DOCUMENTS

| | | |
|---|---|---|
| 2002/0180997 A1 | 12/2002 | Rozzi |
| 2010/0325413 A1 | 12/2010 | Chandramouli et al. |
| 2015/0047037 A1 | 2/2015 | Wood |
| 2016/0283746 A1 | 9/2016 | Boshoff et al. |
| 2017/0163839 A1 | 6/2017 | Arana et al. |
| 2019/0005972 A1* | 1/2019 | Gogerly ........... G11B 20/00891 |

OTHER PUBLICATIONS

Kessler, Gary C., "An Overview of Steganography for the Computer Forensics Examiner", Feb. 2015, 29 pages, [online] [Retrieved on Sep. 21, 2018] <URL: https://www.garykessler.net/library/fsc_stego.html>.

* cited by examiner

Primary Examiner — Brian F Shaw
(74) Attorney, Agent, or Firm — Haynes and Boone, LLP (57) ABSTRACT A system and method for preventing hidden data being passed using steganography by performing additional steganography to obscure the hidden data such that the hidden data is unrecoverable without information regarding the method of the additional steganography. This system and method allows for preventing hidden data without having to decipher the hidden data.

17 Claims, 3 Drawing Sheets

FIG. 3 ively ignored. There is a way to prevent hidden messages being passed through steganography without knowing the message. One does not need to know the message to jumble the

STEGANOGRAPHY OBSFUCATION

CROSS REFERENCE TO RELATED APPLICATION

The present application is a continuation application of U.S. patent application Ser. No. 15/609,087, filed May 31, 2017, all of which is hereby incorporated by reference in its entirety.

TECHNICAL FIELD

The present disclosure generally relates to prevention of passing hidden data through steganography.

BACKGROUND

Recently steganography has been used to pass hidden data in files undetected. The hidden data may be hidden messages, malware, entire files, and/or other data. As such steganography poses a huge security risk on multiple fronts. For example, steganography can be used to pass confidential information, secret information, and/or viruses undetected over monitored communication channels.

Applicant recognizes that there is a need for a system and method of preventing secret communications using steganography.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, persons skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

While a lot of technology is focused on decrypting steganography messages that are being passed in files, Applicant recognizes that preventative measures have been ignored. There is a way to prevent hidden messages being passed through steganography without knowing the message. One does not need to know the message to jumble the message. As such, preventing hidden messages from being passed through steganography techniques can be prevented by implementing a jumbling technique. Furthermore, attempting to jumble a message does not require knowing whether a message even exists. One could jumble all files whether there was a hidden steganography message or not. In this manner, any message added into a file through steganography would be jumbled and unusable. In some cases, the jumbling may be an encryption algorithm that can be unjumbled using a key. However, since there are so many different ways to hide information, jumbling of the message should be done in a selective way. To some extent, applying steganography to a file will degrade the file or increase the size of the file. Thus, any jumbling algorithms used on a file should be done efficiently such that the file is not overly degraded. It would be beneficial if any noise was added by the jumbling algorithm, that the noise be imperceptible or nearly imperceptible by a human.

Furthermore, it would be beneficial if the system could unjumble or remove jumbling added to the file. In this manner, the system may be able to recover a hidden message if requested. Additionally, the system should be able to efficiently track whether jumbling has been added to the file previously. If jumbling hidden messages adds noise, if this isn't tracked and additional jumbling is added to the file repeatedly, the file may be degraded to the point that the degradation is perceptible.

This system to prevent the transfer of hidden messages in files may, in some examples, be an intermediary device that sit between the sending device and the recipient device. The intermediary device may ensure that any file that passes to the recipient device and/or is from the recipient device do not have readable hidden messages through jumbling. In some examples, the jumbling may be using a steganography algorithm that is the same and/or similar to any detected steganography in a file. One benefit of having the intermediary device would be that the file with the hidden message or data is never held on the recipient device. This allows for a more secure environment.

In some examples, the system for preventing hidden messages may be processes running on the recipient device. Although less secure than having an intermediary device, having the security system on the recipient device is more efficient with resources.

Figure 1:
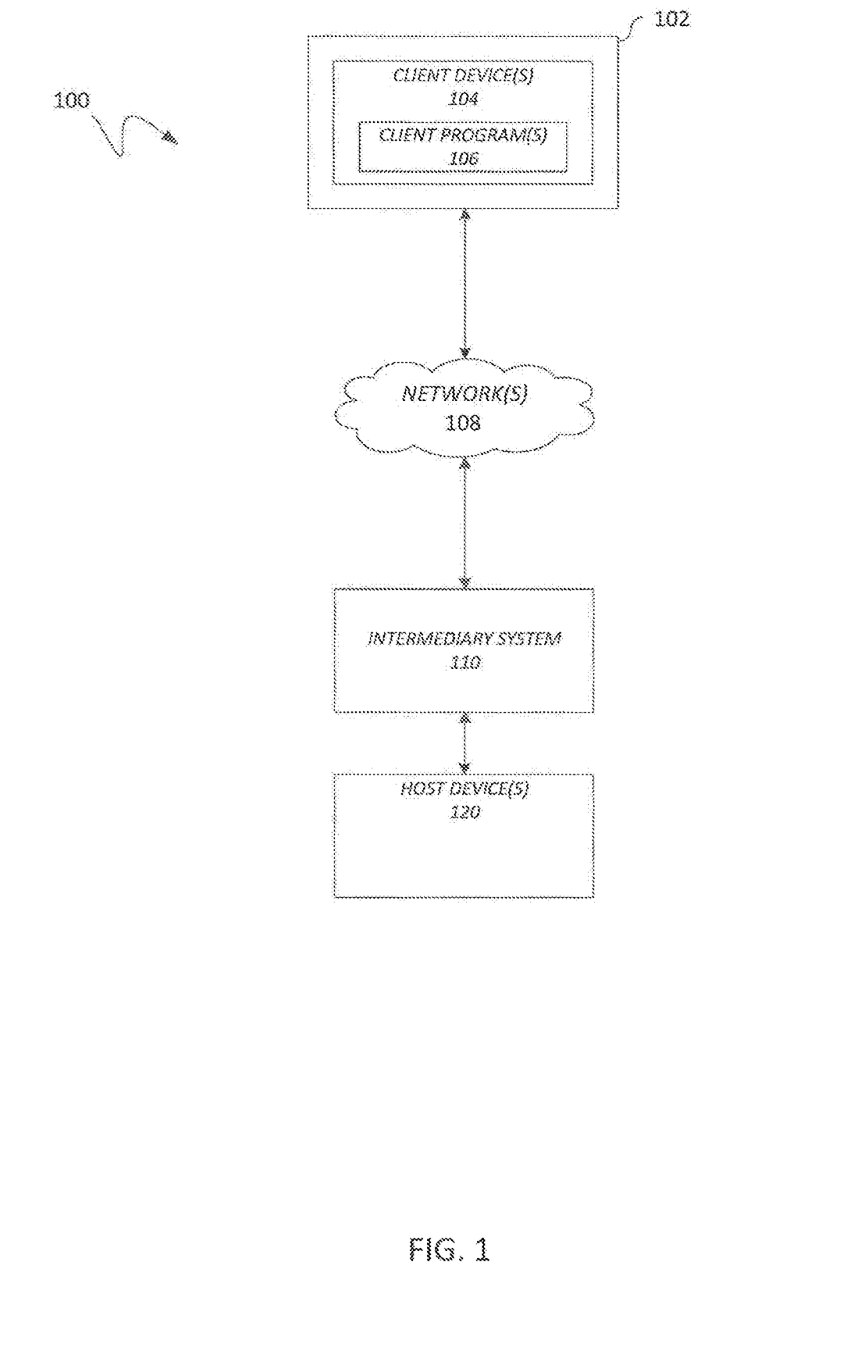
FIG. 1 is a block diagram of an exemplary computing system for obscuring data hidden using steganography.

FIG. 1 illustrates, in block diagram format, an exemplary embodiment of a computing system adapted for implementing one or more embodiments disclosed herein to prevent sending and/or receiving files with hidden data through steganography. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers operating a operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to an intermediary system 110. Intermediary system 110 may be structured, arranged, and/or configured to allow client 102 to establish one or more communications sessions to host devices 120 and various computing devices 104 and/or client programs 106 through intermediary system 110. Accordingly, a communications session between client devices 104 and intermediary system 110 may involve the unidirectional and/or bidirectional exchange of information and may occur over one or more types of networks 108 depending on the mode of communication. While the embodiment of FIG. 1 illustrates a computing system 100 deployed in a client to network to intermediary to host device environment, it is to be understood that other suitable operating environments and/or architectures may be used in accordance with the described embodiments. For example, in some examples, the intermediary device may be directly connected to client device 104 before network 108. In some examples, the intermediary may be held on client device 104 as one of client programs 106. In some examples, the intermediary may be part of the host device 120.

Data communications between client devices 104 and the intermediary system 110 may be sent and received over one or more networks 108 such as the Internet, a WAN, a WWAN, a WLAN, a mobile telephone network, a landline telephone network, personal area network, as well as other suitable networks. For example, client devices 104 may communicate with intermediary system 110 over the Internet or other suitable WAN by sending and receiving information via interaction with a website, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

Intermediary system 110 may comprise one or more communications servers to provide suitable interfaces that enable communication using various modes of communication and/or via one or more networks 108. Communications servers may include a web server, an API server, and/or. Intermediary system 110 may be structured, arranged, and/or configured to provide various services to client devices 104 and/or host devices 106. In various embodiments, client devices 104 may communicate with intermediary system 110 and/or host devices 120 via one or more of a web interface, a programmatic interface, and/or the like. It may be appreciated that intermediary system 110 and host device 120 may be structured, arranged, and/or configured to communicate with various types of client devices 104, and/or client programs 106 and may interoperate with each other in some implementations.

In some examples, intermediary system 110 and/or host devices 120 may be arranged to communicate with web clients and/or applications such as a web browser, web browser toolbar, desktop widget, mobile widget, web-based application, web-based interpreter, virtual machine, mobile applications, various client programs comprising an implementation of API, and so forth. Intermediary system 110, host devices 120, and/or client devices 104 maybe communicate with each other with various messaging clients and/or applications such as e-mail, IM, SMS, MMS, telephone, VoIP, video messaging, IRC, and so forth, and through a messaging interface.

In some examples, intermediary system 110 may be a server that provides various services to client devices 104 and/or host devices 120, such as malware detection, steganography detection, and/or other services. Intermediary system 110 may include multiple servers and/or components. For example, intermediary system 110 may include a file analyzer, steganography detection engine, and/or a encryption generating engine. These servers and/or components, which may be in addition to other servers, may be structured and arranged to prevent exchange of data hidden in files.

Intermediary system 110 may be coupled to and capable of accessing one or more databases such as a steganography signature database, encryption algorithm database, classified files database, file signatures database, and/or other databases. The databases generally may store and maintain various types of information for use and may comprise or be implemented by various types of computer storage devices (e.g., servers, memory) and/or database structures (e.g., relational, object-oriented, hierarchical, dimensional, network) in accordance with the described embodiments.

Figure 2:
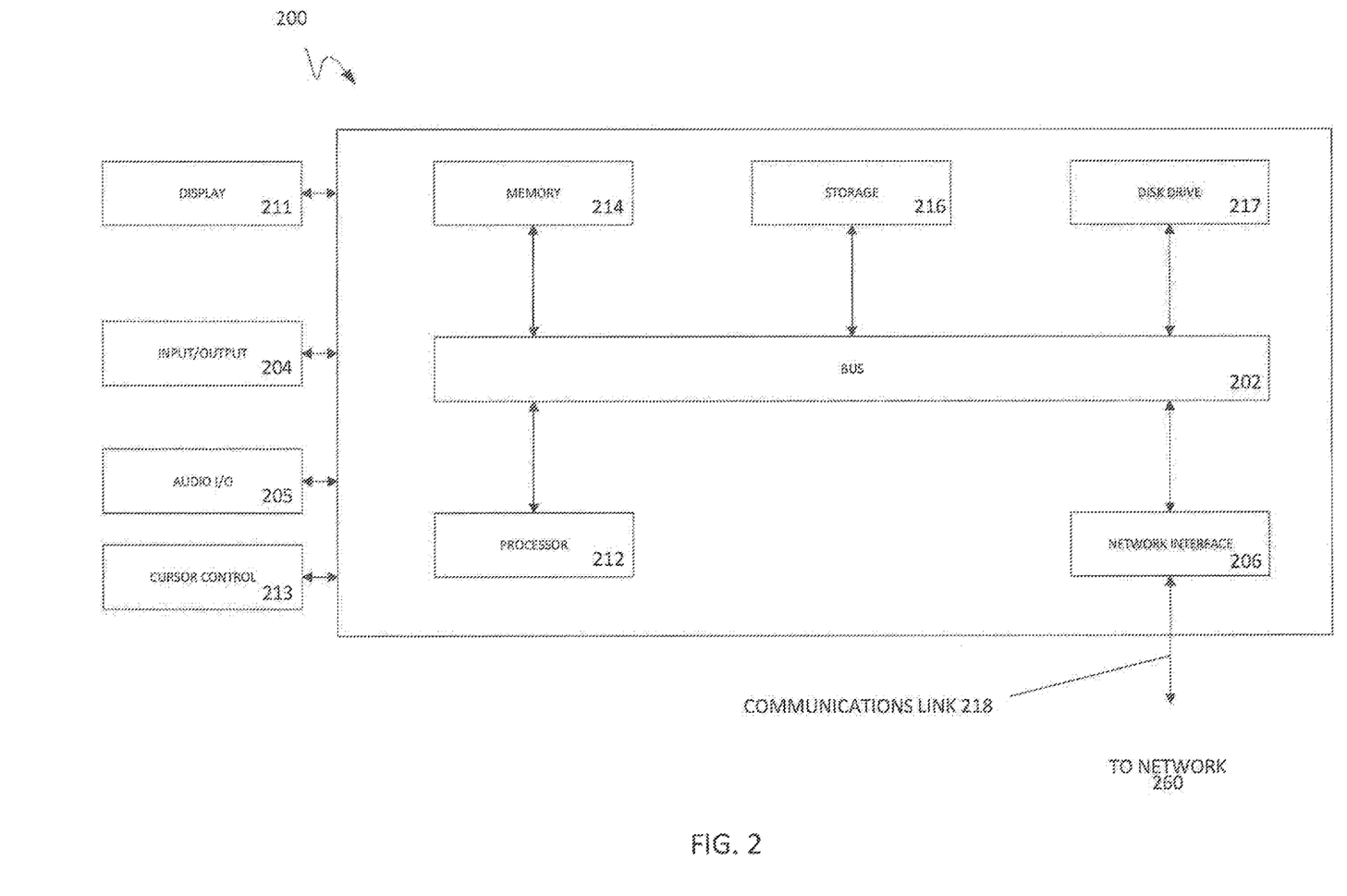
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touchscreen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal-oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, intermediary system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
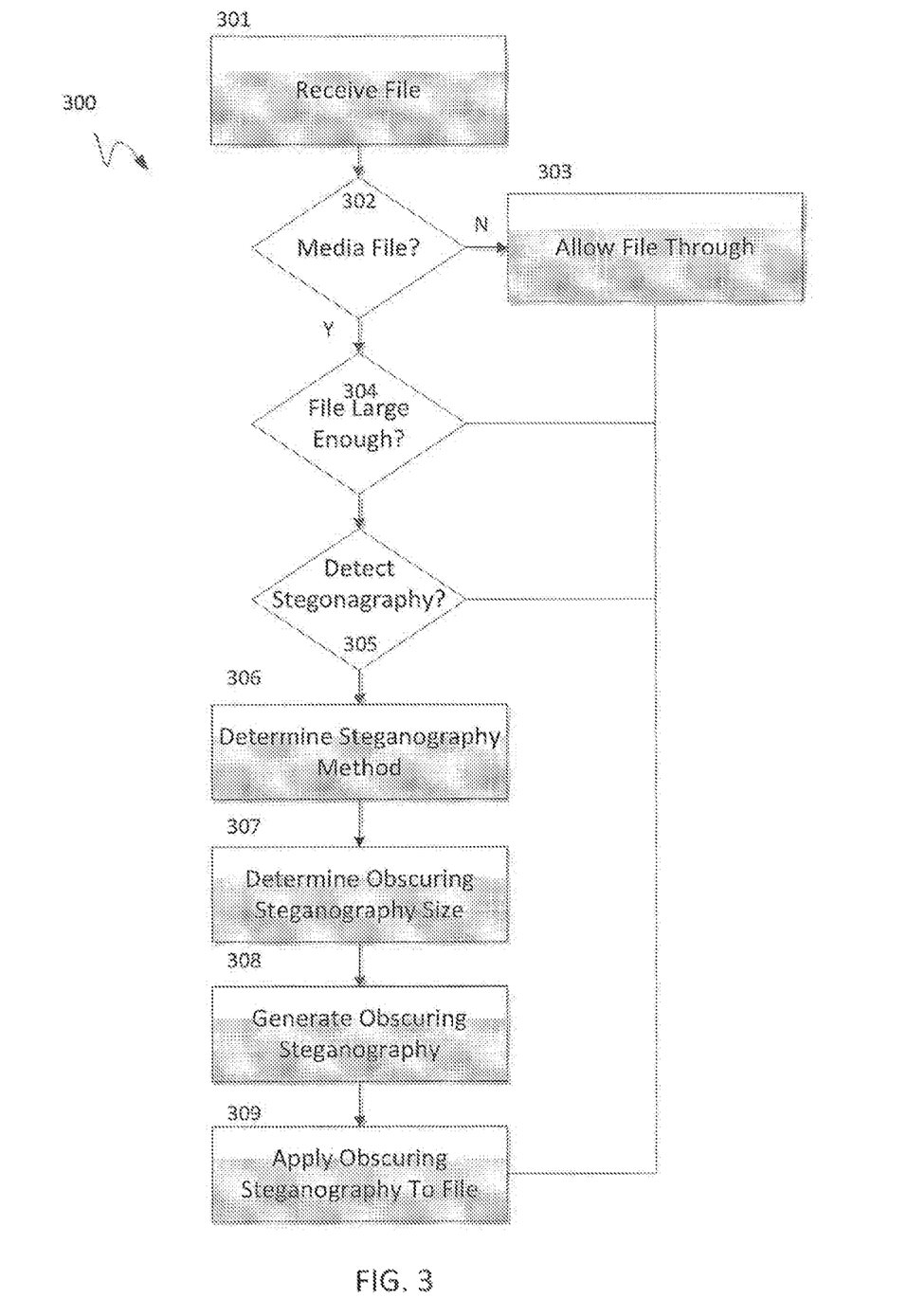
FIG. 3 is a flow diagram illustrating an exemplary process for obscuring data hidden using steganography.

FIG. 3 illustrates an exemplary process 300 for obscuring, encrypting, scrambling data hidden using steganography. In some examples, process 300 may be implemented on system 100 and/or one or more devices of system 100 in FIG. 1. Process 300 may be implemented on an intermediary device that intercepts files before sending it to the final destination of the file. In some embodiments, process 300 may be implemented on client and/or recipient device. According to some embodiments, process 300 may include one or more of operations 301-309, which may be implemented, at least in part, in the form of executable code stored on a non-transitory, tangible, machine readable media that, when run on one or more processors, may cause a system to perform one or more of the operations 301-309. Although in this example process 300 is shown with operations 301-309 in a certain flow, it is contemplated that some of the operations may be omitted and/or rearranged and/or additional operation may be added in combination with operation 301-309.

Process 300 may include operation 301. At operation 301 a system may receive a file. In some examples, the file may be received as part of a peer-to-peer communication, download by a user device from a server, as part of an e-mail communication, and/or the like.

Process 300 may include operation 302. At operation 302, the system may check whether the file is a type of file that the system is configured to obscure and/or check for steganography messages. In some examples, the system may be configured to obscure steganography that has been placed in media files, such as sounds files, image files, video files, and/or the like. In some examples, the system may check the extension of the file to determine the file type. In some examples, to prevent faking a file by tampering with the file extension, the system may analyze the binary signature of the file and/or pattern matches of specific file formats like the headers, trailers, and/or the like to determine the file type. In some examples, when files are sent in a compressed format (e.g. zip files), the system may decompress the file and analyze each file within the compressed file individually. If the file is not a file type that the system is configured to handle for obscuring steganography, the system may continue to operation 303 wherein the system allows the file to pass through or block the file. On the other hand, if the system determines that the file is a file type that the system is configured to handle, the system may continue to operation 304.

Process 300 may include operation 304. At operation 304, the system may determine whether the file is large enough to contain a hidden message through steganography without noticeably degrading the information in the file. For example, certain ten-pixel images would not be able to maintain a message without noticeably degrading the image or increasing the file size. As such, to reduce load, unnecessarily changing a file, and/or prevent degradation from applying steganography on the file, the system may determine some files below a threshold size do not need obscuring. For example, the system may be configured to prevent certain types of data which may have a minimum size. Generally, the carrier file would have to be 8-10 times larger than the data to encode with steganography. As such, the system might ignore files below that threshold size. In some examples, the threshold size may be dependent on the type of file as different file types can handle more or less degradation, usually based on how compressed the data is using the file format. If the file is above the threshold size, the system may continue to operation 305, otherwise the operation may continue to operation 303 where the file is allowed through.

Process 300 may include operation 305. At operation 305, the system may analyze the file received at operation 301 for steganography. There are several methods of implementing steganography on a file, including but not limited to various methods of frequency domain steganography such as steganography based on discrete cosine transformation, discrete wavelet transformation, discrete Fourier transformation; various spatial domain steganography such as encoding data in the least significant bit ("LSB"), LSB replacement, LSB matching, matrix embedding; embedding data in the comments, head fields, and/or the like; masking and filtering; and/or the like. There are many more methods of steganography including sub-methods for each. For example, JSteg and F5 are two different versions of discrete cosine transformation steganography implemented on images, which is a form of frequency domain steganography. As there are many different methods of performing steganography, the system may use multiple algorithms and/or tests for detecting steganography. For example, the system may have a test specifically for spatial domain steganography by checking the amount of noise added to the file, as spatial domain steganography tends to add noise. Similarly, the system may check irregularities in discrete cosine transform coefficients for detecting discrete cosine transform steganography, and so forth. Most steganography techniques will have some sort of data signature associated with it, which the system may be configured to detect.

In some examples, the system may implement a classifier using machine learning to detect whether a file has steganography in it. For example, a neural network that has been trained on a dataset of known files with and without steganography could be used to categorize received files for steganography. Other forms of classifiers based on machine learning also may be used in addition or instead.

If the system detects steganography, the system may continue to operation 306, otherwise if the system does not detect any steganography, the system may continue to operation 303 where the file is allowed through to the final destination. In this manner, the system does not have to unnecessarily degrade or edit a file and/or attempt to obscure steganography that does not exist.

In some examples, as discussed below, the file may be a file that the system has applied steganography (or multiple iterations and/or different steganography) over at some point in time. The system may check whether the file has been altered through checksums and/or hash values to determine whether the file has been altered. If the file has not been altered the system may allow the file through, otherwise the system may continue to operation 306. Additionally, as discussed in more detail below, the information regarding prior steganography applied to the file may be hidden in the file. Furthermore, the system may maintain or determine from the hidden information how to remove prior steganography and remove the prior steganography before applying any new obscuring steganography.

Process 300 may include operation 306. At operation 306, the system may detect the steganography method used on the file. Often when data is hidden using steganography, it is difficult to determine what exactly the data is. The data will often be encrypted or difficult to extract from the file without some sort of key or knowing the exact method used to hide the data. However, it is unnecessary to know the message when trying to prevent passing of secret messages and/or encrypted secret messages. Identifying the method of steganography used can help determine the most efficient manner for obscuring any secret messages hidden in the file using steganography. In some examples, the system may implement a certain mix of steganography techniques to obscure hidden data instead of or without having to detect steganography or a steganography type. In some examples, instead of having to implement noise or encryption for every possibly type of steganography or a large mix of steganography techniques to obscure the hidden message, the system can implement the detected version. For example, if the system detects steganography in the frequency domain, and possibly for particular frequencies, the system may obfuscate in the frequency domain. For example, steganography may be implemented in certain frequencies of an audio file, such as frequencies that are not audible to the human ear. The system may detect irregularities for that particular frequency in the file. In contrast if the system detects steganography in the spatial domain, the system may obfuscate information in the spatial domain In some examples, multiple forms of steganography may be applied. For example, a video file may use some forms of special steganography on the image, frequency domain steganography on the image, and frequency domain steganography on the audio. In such cases, the system may detect the multiple forms of steganography used.

As discussed above in operation 305, different steganography methods leave their own signatures, which can be used to detect the type of steganography implemented in a file. In some examples, the system may determine the type of steganography used and/or appropriate forms of obfuscation to use to destroy, hide, and/or encrypt the steganography data. For example, the system may determine that all data in a certain frequency be erased. In another example, the system may implement an encryption steganography using similar methods as the detected steganography such that the message is encrypted, but also can be unencrypted using a key held by the system. In some examples, the system may determine to insert noise to obfuscate the message.

As discussed above, in some examples, machine learning algorithms may be used to detect the steganography method used on the file, which would dictate the method of obfuscation, which may apply the same steganography method on top of the message to obfuscate the message.

Operations 302 and 304-306 are operations that can increase the efficiency of the obfuscating of steganography messages, but can be omitted. For example, the system can simply assume every file has a steganography message and apply a standard encryption steganography on top that is broad spectrum and applies to multiple steganography methods and/or applies multiple encrypting steganography methods to obfuscate each type of possible steganography message (e.g. assume there is a steganography message of every format, and obfuscate all of them). This may not be the most efficient manner in obfuscating hidden steganography data, but it would allow one or more of operations 302, and 304-306 to be skipped. Furthermore, skipping those operations may be less computationally and resource intensive and/or faster.

In some examples, process 300 may include operation 307. At operation 307, the system may determine how much obscuring would be appropriate for the file. The system may determine the amount of obscuring based on the file size and file type. The larger the file and the less compressed the file is, the more obscuring the system can perform without perceptible degradation to the file (e.g. introducing perceptible noise in an image, sound artifacts to audio, loss of volume to audio, and/or the like). In some examples, the system may apply machine learning to determine the amount or size of the obscuring steganography used. For example, the system may have a file comparison tool, for example an image comparison tool, audio file comparison tool, video comparison tool, and/or the like. The system may determine the similarity of the output of the file in comparison to a file modified with the obscuring steganography and determine the amount other the obscuring steganography. The system may use a predetermined threshold similarity value, such as a 90%, as being imperceptible degradation to the file. In some examples, this predetermined value may be determined through heuristics.

In some examples, process 300 may include operation 308. At operation 308, the system may generate the obscuring steganography to perform onto the file. The obscuring steganography may be based on the size determined at operation 307, and the types of steganography detected at operation 306. In some examples, the steganography may be noise to be added, such as Gaussian noise or other noise. Adding such noise may obscure the message significantly enough make it unsalvageable. In some example, the noise may be to remove all data in a certain area. For example, any data in a frequency that cannot be heard by the human ear in an audio file may be turned into 0s or 1s, such that the data hidden in those frequencies cannot be extracted.

In some examples, the obscuring steganography may be an encryption algorithm. In this manner, the steganography data within the file would be encrypted by the obscuring steganography. A simple encryption may be to flip every other bit. So, a message meant to be 1001 would turn into 0011. In this manner, the steganography data would be preserved, but the information would not be acceptable without the encryption key. Other forms of encryption may be applied instead and/or in addition.

In some examples, the amount of noise, the type of encryption, the number of encryptions, and/or the like that can be added to the file to obscure steganography messages may depend on the size determined at operation 307.

Process 300 may include operation 309, wherein the system may apply the generated obscuring algorithm of operation 308 onto the received file. The system may then allow the file modified at operation 308 through at operation 303. The modified file having sufficiently obscured the data hidden in the file by applying the obscuring methods generated at operation 308. Additionally, in some examples, the system may maintain records of files that have gone through the obscuring processes in operation 309. As files get sent back and forth over and over again, continuously performing operation 308 on the files would overly degrade the files. As such, maintaining a database of files that have passed through the system would allow the system to determine whether some files do not have to be obscured. In some examples, the records may be a checksum and/or a hash of the file. The hash could identify the file and/or ensure that the file has not changed since the last time the system applied obscuring steganography. Similarly, the checksum would allow for the system to ensure that the file has not changed as well.

In some examples, the checksum and/or has may be encoded into the file instead of maintained in a database. In this manner, the system does not need to waste resources holding data for each file. The system could check for the encoded information to determine whether the file has gone through this process. Furthermore, the encoded information may provide instructions on how to remove the obscuring steganography. In this manner, the system could remove the old steganography and add new steganography without increasing the degradation of the file.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
receiving a media file over a network communication;
identifying the media file based on a checksum and/or a hash of the media file:
detecting that a first steganography has been applied to the media file based on encoded information of the media file including the checksum or the hash of the media file; and
applying, based on the encoded information of the media file, a second steganography on the media file, the second steganography configured to remove the first steganography from the media file, wherein the encoded information includes instruction on the applying the second steganography on the media file to remove the first stenography from the media file.

2. The system of claim 1, wherein the operations further comprise: applying a third steganography to the media file to obscure a steganographic message stored within the media file, the steganographic message generated by applying a fourth steganography to the media file.

3. The system of claim 1, wherein applying the third steganography comprises encrypting the fourth steganography applied to the media file.

4. The system of claim 3, wherein applying the third steganography to encrypt the fourth steganography does not affect a quality of the media file.

5. The system of claim 2, wherein the third steganography and the fourth steganography are applied to the media file in a frequency domain.

6. The system of claim 2, wherein the third steganography and the fourth steganography are applied to the media file in a spatial domain.

7. A computer-implemented method, comprising:
receiving a media file over a network communication;
identifying the media file based on a checksum and/or a hash of the media file;
detecting that a first steganography has been applied to the media file based on encoded information of the media file including the checksum or the hash of the media file; and
applying, based on the encoded information of the media file, a second steganography on the media file, the second steganography configured to remove the first steganography from the media file, wherein the encoded information includes instruction on the applying the second steganography on the media file to remove the first steganography from the media file.

8. The computer-implemented method of claim 7, further comprising: applying a third steganography to the media file to obscure a steganographic message stored within the media file, the steganographic message generated by applying a fourth steganography to the media file.

9. The computer-implemented method of claim 8, wherein the applying the third steganography comprises encrypting the fourth steganography applied to the media file.

10. The computer-implemented method of claim 9, applying the third steganography to encrypt the fourth steganography does not affect a quality of the media file.

11. The computer-implemented method of claim 8, wherein the third steganography and the fourth steganography are applied to the media file in a frequency domain.

12. The computer-implemented method of claim 8, wherein the third steganography and the fourth steganography are applied to the media file in a spatial domain.

13. A non-transitory computer-readable medium having stored thereon instructions executable by a computer to cause the computer to perform operations comprising:
receiving a media file over a network communication;
detecting that a first steganography has been applied to the media file based on encoded information of the media file including a checksum or a hash of the media file; and
applying, based on the encoded information of the media file, a second steganography on the media file, the second steganography configured to remove any steganography messages within the media file, wherein the encoded information includes instruction on the applying the second steganography on the media file to remove the first steganography from the media file.

14. The non-transitory computer-readable medium of claim 13, the operations further comprise: applying a third steganography to the media file to obscure a steganographic message stored within the media file, the steganographic message generated by applying a fourth steganography to the media file.

15. The non-transitory computer-readable medium of claim 14, wherein applying the third steganography comprises encrypting the fourth steganography applied to the media file.

16. The non-transitory computer-readable medium of claim 14, wherein the third steganography and the fourth steganography are applied to the media file in a frequency domain.

17. The non-transitory computer-readable medium of claim 14, wherein the third steganography and the fourth steganography are applied to the media file in a spatial domain.

* * * * *

UNITED STATES PATENT AND TRADEMARK OFFICE
CERTIFICATE OF CORRECTION

PATENT NO. : 10,949,392 B2  
APPLICATION NO. : 16/459374  
DATED : March 16, 2021  
INVENTOR(S) : Boutnaru Page 1 of 1

It is certified that error appears in the above-identified patent and that said Letters Patent is hereby corrected as shown below:

In the Claims

At Column 11, Line 24 Claim 1, please replace "first stenography" with "first steganography"

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*